United States Patent
Lee et al.

(10) Patent No.: US 7,733,776 B1
(45) Date of Patent: Jun. 8, 2010

(54) ALTERING SWITCH BEHAVIOR BASED ON STATISTICAL DATA

(75) Inventors: Garrett Oren Lee, Spokane, WA (US); Loren Larsen, Lindon, UT (US)

(73) Assignee: World Wide Packets, Inc., Spokane Valley, WA (US)

( * ) Notice: Subject to any disclaimer, the term of this patent is extended or adjusted under 35 U.S.C. 154(b) by 691 days.

(21) Appl. No.: 11/533,887

(22) Filed: Sep. 21, 2006

(51) Int. Cl.
*H04J 1/16* (2006.01)
(52) U.S. Cl. .................................................. 370/230.1
(58) Field of Classification Search ................. 370/351, 370/428, 429, 389, 422, 423, 229–237
See application file for complete search history.

(56) References Cited

U.S. PATENT DOCUMENTS

| | | | |
|---|---|---|---|
| 6,222,822 B1 * | 4/2001 | Gerardin et al. ............. | 370/230 |
| 6,628,613 B1 * | 9/2003 | Joung et al. ................. | 370/230 |
| 2002/0080721 A1 * | 6/2002 | Tobagi et al. ................ | 370/236 |
| 2003/0103450 A1 * | 6/2003 | Chapman et al. ............ | 370/229 |
| 2005/0089038 A1 * | 4/2005 | Sugai et al. ................. | 370/394 |
| 2006/0092836 A1 * | 5/2006 | Kwan et al. ................. | 370/229 |

* cited by examiner

*Primary Examiner*—Kwang B Yao
*Assistant Examiner*—Obaidul Huq
(74) *Attorney, Agent, or Firm*—Wells St. John, P.S.

(57) ABSTRACT

This document describes tools that enable a switch to temporarily alter its forwarding behavior when statistical data characterizing the switch satisfies a user-specified condition. To do so, the tools may monitor chronological sets of statistical data associated with the switch over a period of time. If the tools determine at one point during the period of time that one set of statistical data satisfies the user-specified condition, the tools alter the forwarding behavior of the switch for the remainder of the period of time. At the conclusion of the period of time, the tools restore the original forwarding behavior to the switch.

14 Claims, 7 Drawing Sheets

ALTERING SWITCH BEHAVIOR BASED ON STATISTICAL DATA

BACKGROUND

Data-packet switches are a central part of data networks. Some data-packet switches are able to perform port rate limiting whereby the data-packet switch limits the amount of data that ingresses a particular port of the data-packet switch to a user-specified amount. Currently, sophisticated, high-end data-packet switches are capable of performing port rate limiting.

To enforce a rate limit, a data-packet switch may inspect data packets received at a port on a packet-by-packet basis to determine if forwarding a particular data packet to a destination port of the data-packet switch will violate the rate limit. If forwarding the data packet will violate the rate limit, the data packet is discarded rather than forwarded to the destination port.

Performing packet-by-packet inspection requires that the data-packet switch utilize a silicon device having specific hardware features. These features are typically available only on high-end, expensive silicon devices and may include: memory for storing data packets while waiting for inspection; inspection logic for inspecting each data packet; and classification logic for classifying each data packet according to one or more parameters, such as classification according to the port on which the data packet ingressed the data-packet switch.

Using these expensive silicon devices results in an expensive data-packet switch. Due to their expense, operators cannot afford to deploy such data-packet switches widely in their networks, despite their desire to use rate limiting. Consequently, operators often limit deployment of rate limiting to a few locations within their networks.

SUMMARY

This document describes tools that enable a switch to temporarily alter its forwarding behavior when statistical data characterizing the switch satisfies a user-specified condition. To do so, the tools may monitor chronological sets of statistical data associated with the switch over a period of time. If the tools determine at one point during the period of time that one set of statistical data satisfies the user-specified condition, the tools alter the forwarding behavior of the switch for the remainder of the period of time. At the conclusion of the period of time, the tools restore the original forwarding behavior to the switch.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools capable of altering the forwarding behavior of a switch based on statistical data. An environment in which the tools may enable these and other actions is set forth below in a section entitled Exemplary Operating Environment. This is followed by another section describing exemplary ways in which the tools may act to alter the forwarding behavior of a switch based on statistical data and is entitled Exemplary Embodiments for Utilizing Statistical Data to Limit the Number of Data Packets Forwarded during a Condition Application Period. A final section describes these and other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes an example and is not intended to limit application of the tools to any one particular operating environment. Other environments may be used without departing from the spirit and scope of the claimed subject matter.

Figure 1:
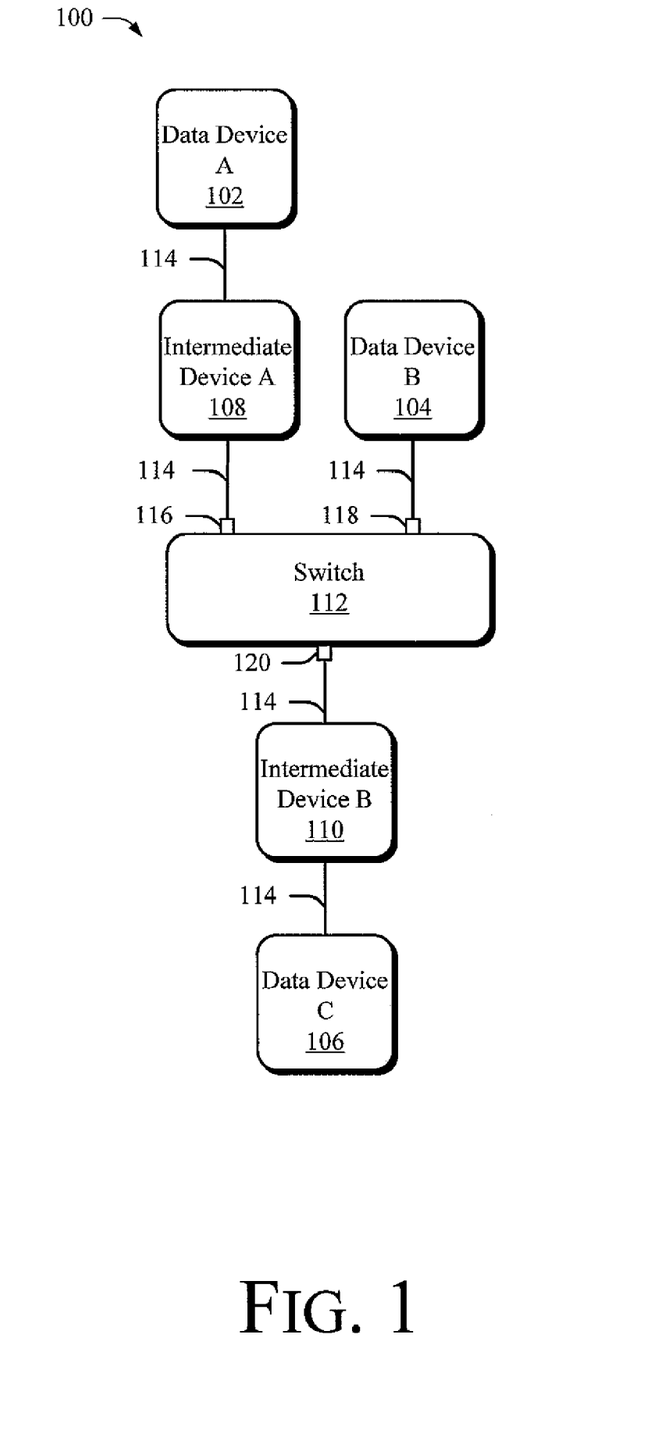
FIG. 1 illustrates an exemplary operating environment in which various embodiments of the tools may operate.

FIG. 1 illustrates one operating environment generally at 100 for enabling equipment to temporarily alter switch forwarding behavior based on statistical data. The environment includes three data devices 102, 104, 106; two intermediate devices 108, 110; a switch 112; and five physical links 114.

Each data device 102, 104, 106 sends data packets to another data device through the switch 112 and one or more intermediate devices 108, 110 and receives data packets sent by another data device through the switch and one or more intermediate devices. Each data device may comprise a computer, a server, a personal digital assistant (PDA), a wireless data device, or other device capable of sending and receiving data packets.

Each intermediate device couples a data device to the switch. Each intermediate device may be a switch, router, hub, or other device capable of forwarding data packets. Although the intermediate devices illustrated in FIG. 1 are each connected to a single data device and the switch, intermediate devices may generally be connected to a plurality of data devices and switches.

Each intermediate device may be used to aggregate data packets. For example, intermediate device A 108 may be connected to additional data devices (not illustrated). In this situation, intermediate device A may receive data packets from several data devices and forward the data packets on a single link to the switch. Using intermediate device A to aggregate data packets from several data devices may be a more efficient manner of operating a network than if each of the data devices was directly connected to the switch.

More than one intermediate device may be used to couple a data device to the switch. For example, a chain of connected intermediate devices could connect to a data device at one end and to the switch at the other.

The switch 112 comprises a plurality of ports 116, 118, 120 which transmit and receive data packets. The switch forwards each data packet received on a port to a destination port based on a destination address included in the data packet. The destination port may change from data packet to data packet based on the destination address. In the environment illustrated in FIG. 1, the switch is connected to intermediate device A, data device B, and the intermediate device B.

In this embodiment, the switch forwards data packets it receives from intermediate device A, data device B, and intermediate device B to their intended destinations according to the destination address. Of course, in other embodiments, the switch may include additional ports through which it may be connected to other data devices or other intermediate devices.

Each physical link 114 provides a communication path between two devices, enabling the two devices to exchange data packets. Each physical link comprises a medium. For example, the medium may be twisted-pair copper, single-mode fiber, multi-mode fiber, a radio frequency, or other medium.

Each physical link also comprises a protocol used to communicate over the physical medium. For example, the devices may communicate using Ethernet data packets, Asynchronous Transfer Mode (ATM) cells, Time Division Multiplexing (TDM) messages, or the like. Additionally, each physical link may use higher-level protocols such as Internet Protocol (IP) or Transmission Control Protocol (TCP).

Each physical link has a physical maximum data rate at which it may convey data between two devices. The physical maximum data rate is typically described in terms of the number of bits per second that may be conveyed by the physical link and the protocols operating on the link. For example, a particular combination of a twisted-pair copper physical medium and the Ethernet protocol may convey data at a maximum rate of 100 Mbps. Another combination of physical medium and protocols may operate at a different maximum rate.

The switch limits the amount of data forwarded by a switch port during a period of time referred to herein as the condition application period to a user-specified amount. Limiting to the user-specified amount is accomplished by examining a plurality of chronological sets of statistical data and comparing each set of statistical data to the user-specified amount. Each set of statistical data may include a port counter that indicates the amount of data forwarded by the switch port since the counter was reset.

The switch divides the condition application period into a plurality of sub-periods and determines, following the expiration of each sub-period, whether the user-specified amount has been exceeded by comparing the amount of data forwarded by the port from the beginning of the condition application period until the end of a particular sub-period with the user-specified amount.

If the amount of data forwarded by the port does not exceed the user-specified amount, the port continues forwarding data packets for an additional sub-period. At the end of the additional sub-period, the switch compares the amount of data forwarded by the port from the beginning of the condition application period until the end of the additional sub-period with the user-specified amount. If the user-specified amount has not been exceeded, the port continues forwarding data packets for another sub-period.

This cycle continues until the end of the condition application period as long as the user-specified amount is not exceeded. If, at the expiration of a sub-period, the amount of data forwarded by the port exceeds the user-specified amount, the switch configures the port to no longer forward data packets it receives prior to the end of the condition application period.

When the condition application period has expired, a new condition application period begins. At the beginning of the new condition application period, the port is configured to forward data packets until the switch determines, at the end of a sub-period, that the user-specified amount has been exceed or until the end of the new condition application period if the user-specified amount is not exceeded.

This method of limiting the amount of data forwarded by a port during a condition application period effectively creates a rate limit for the port. For example, a condition application period of one second and a user-specified amount of one-million bytes results in an effective rate of one-million bytes per second or eight Mbps (one-million bytes per second times eight bits per byte). Similarly, a condition application period of one millisecond and a user-specified amount one-thousand bytes also results in an effective rate of one-million bytes per second or eight Mbps.

A rate limit may be useful when two or more data devices send data packets that are relayed on the same link. For example, if data device A 102 and data device B 104 both send data packets to data device C 106 through switch ports 116 and 118 respectively, the data packets from data devices A and B will be relayed to data device C through switch port 120.

If switch ports 116 and 118 each have a maximum data rate of 100 Mbps, and if data devices A and B both send data packets to data device C at the maximum data rate, then switch port 120 will be unable to convey all the data packets to data device C since switch port 120 has a maximum data rate of 100 Mbps but is being asked to convey data packets at 200 Mbps. Consequently, at least half of the data packets being sent to data device C will be discarded. In addition, the entire capacity of switch port 120 may be consumed so that other data devices will be unable to send data packets to data device C.

To remedy this problem, the switch may limit the amount of data it accepts on a particular port during a period of time to a user-defined amount. For example, in the scenario described above, the switch could be configured so that port 116 and port 118 are each allowed to forward at a rate of 30 Mbps. With these rate limits in place, if all data packets received on port 116 and port 118 are addressed to data device C, they can all be forwarded through port 120 without consuming its 100 Mbps capacity. In fact, a portion of the 100 Mbps capacity of port 120 will not be consumed and is thus available for other data devices (not illustrated) to use in sending data packets to data device C through port 120.

Figure 2:
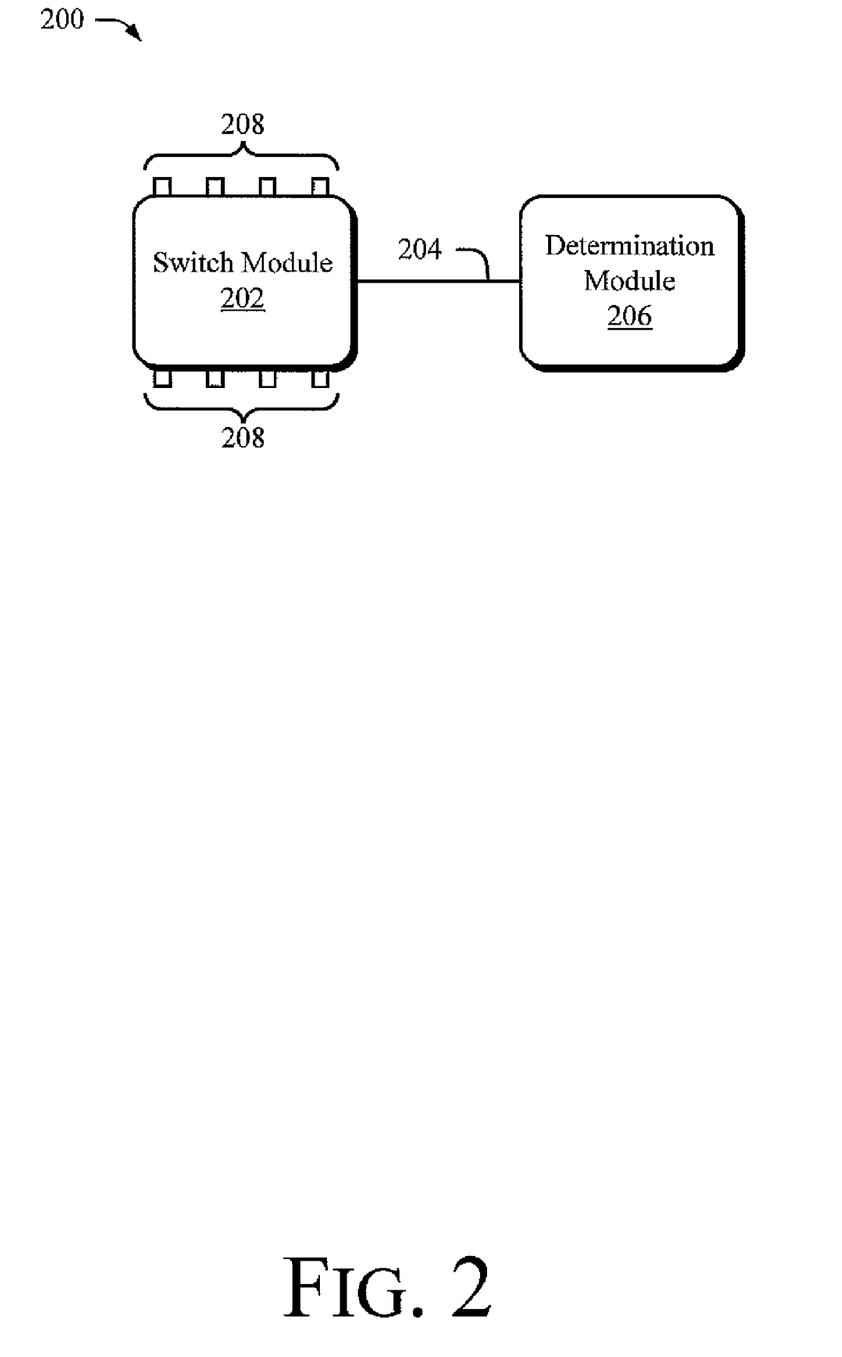
FIG. 2 illustrates an exemplary apparatus capable of altering the forwarding behavior of a switch based on statistical data.
Figure 3:
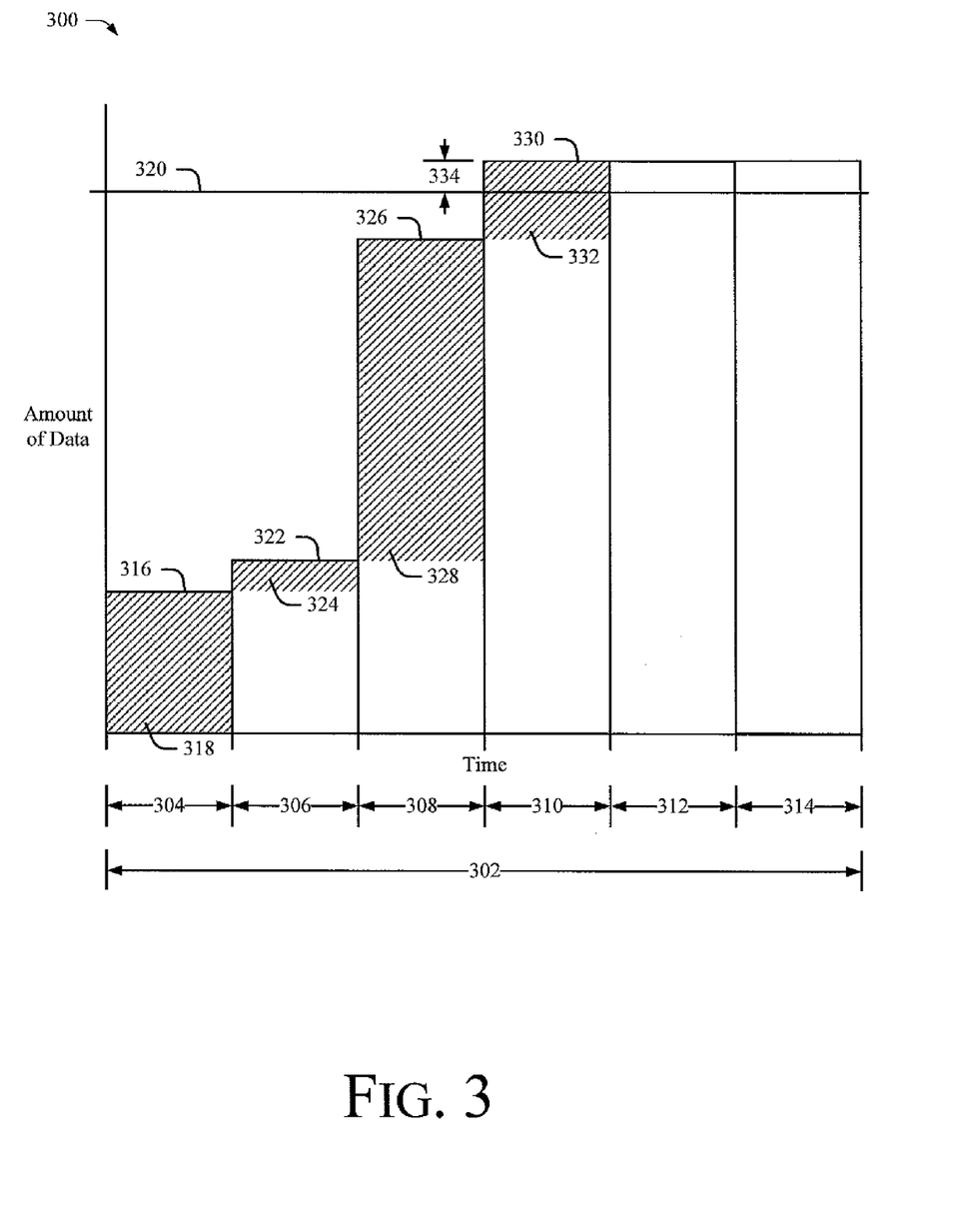
FIG. 3 is a chart illustrating exemplary amounts of data forwarded by a port over a period of time.
Figure 4:
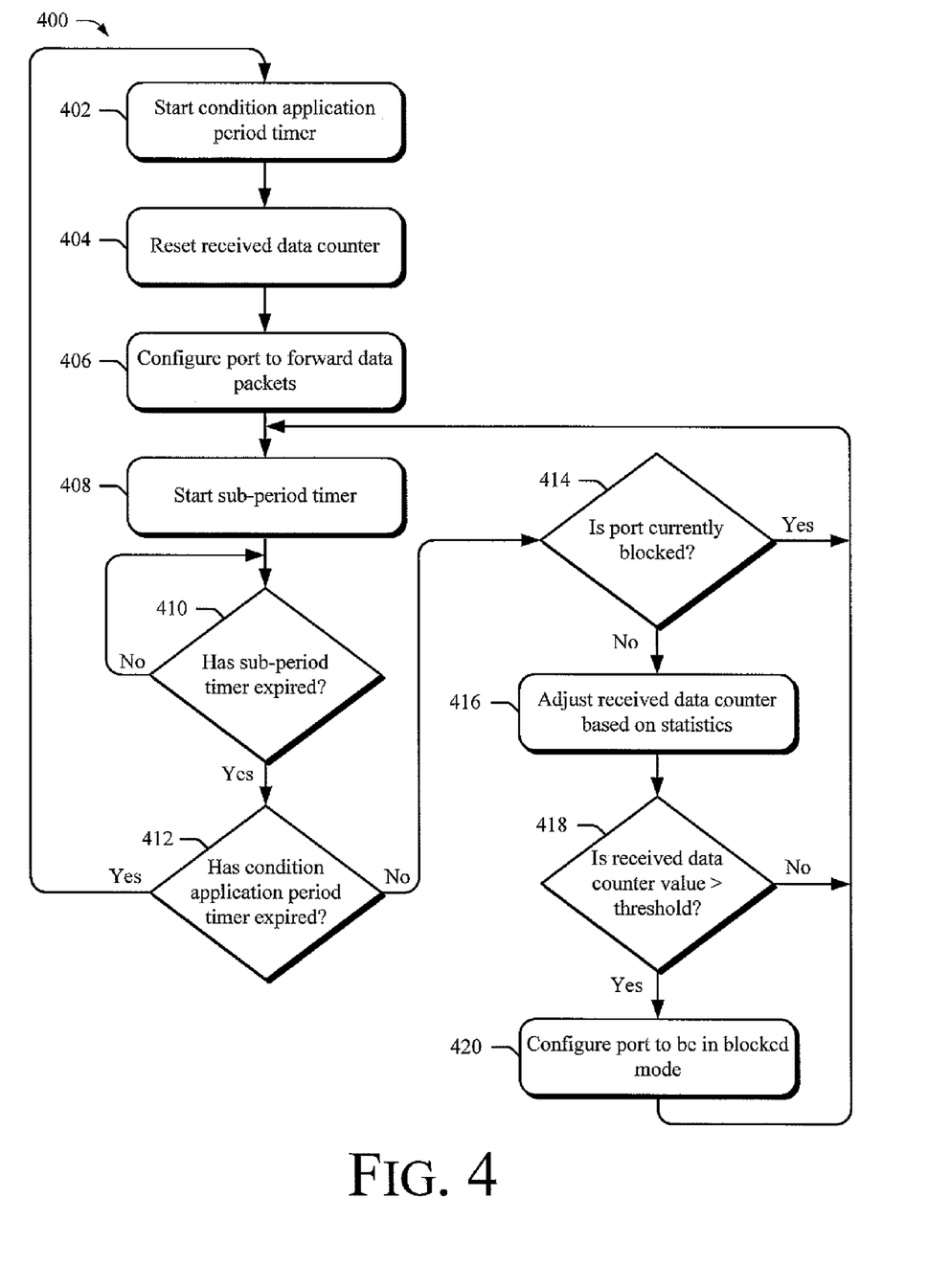
FIG. 4 illustrates an exemplary method of altering the forwarding behavior of a switch based on statistical data.

Exemplary Embodiments for Utilizing Statistical Data to Limit the Number of Data Packets Forwarded During a Condition Application Period FIGS. 2, 3, and 4 illustrate exemplary embodiments of the tools enabling switches to utilize statistical data to limit the number of data packets forwarded by a port during a condition application period. The tools may act in other manners as well, some of which are described in the final section.

FIG. 2 illustrates an exemplary apparatus 200 capable of utilizing statistical data to limit the number of data packets forwarded during a condition application period. The apparatus 200 comprises a switch module 202, a communication link 204, and a determination module 206. The apparatus 200 is one embodiment of a portion of the switch 112 described above.

The switch module 202 is a conventional layer 2 switch module capable of switching data packets. The switch module may be capable of performing some routing or layer 3 functions, though this is not necessary. The switch module has a plurality of ports 208 capable of both ingressing (receiving) and egressing (transmitting) data packets. Each of the ports 208 may be coupled to one of the ports 116, 118, 120 of the switch 112 of FIG. 1. The switch module receives data packets on one or more of the ports 208, makes a forwarding decision for each data packet based on a destination address of the data packet, and egresses the data packets on one or more of the ports 208 based on the forwarding decision.

The switch module may comprise a single switch chip. Alternatively, the switch module may comprise a plurality of chips that work together to forward data packets from an origination port to a destination port. The switch module may be implemented in custom hardware such as an Application Specific Integrated Circuit (ASIC). The switch module may also be implemented in programmable hardware such as a Field Programmable Gate Array (FPGA). Alternatively, the switch module may be implemented as software or firmware for a network processor, or may be implemented using other technology well known to those of skill in the art that is capable of forwarding data packets from an origination port to a destination port.

The switch module provides statistical data that characterizes its operation. The statistical data comprises one or more parameters that store data related to the operation of the switch module. Each parameter may store a value, such as the temperature of the switch module; a count, such as the number of data packets received by a particular port of the switch module, or a number of errored data packets received on all ports of the switch module; an operational state, such as the operational state of a port; or other information relevant to the operation of the switch module. The parameters may characterize the operation of a particular port of the switch module or may apply generally to the entire switch module.

A subset of the statistical data that relates to the amount of data ingressing and egressing the switch module is referred to as usage data. Usage data may include, for example, the number of data packets received on a particular port, the number of data packets transmitted on a particular port, the number of bytes received on a particular port, the number of bytes transmitted on a particular port, or the like.

Usage data is typically stored in a counter, which is a particular type of parameter. The counter may be stored in a hardware register of the switch module and may have a size comprising a particular number of bits.

One example of usage data is a count of the number of bytes received by a particular port of the switch module. This count may be stored in a counter comprising a thirty-two-bit register within the switch module. As additional bytes are received by the particular port, the counter may increment until it reaches a maximum value, at which point the counter may "roll over" meaning that the counter starts over at zero and begins incrementing toward the maximum value again.

The maximum value is determined by the size of the counter. In some embodiments, the counter may be manually reset to zero by a user or may be automatically reset to zero under certain conditions. For example, the counter may be reset to zero when the switch module is powered up.

The switch module does not necessarily store sets of statistical data, each set being a snapshot of the statistical data at a particular point in time. Instead, the switch module may make the current values of the statistical data available to an external device such as the determination module, which may capture the current values and store the current values as a set of statistical data.

In one embodiment, the switch module comprises an Ethernet switch chip capable of forwarding Ethernet data packets. The Ethernet switch chip may be a relatively simple device that is not designed to queue a large number of ingress data packets or perform rate limiting. Furthermore, the Ethernet switch chip may lack a dedicated output queue for each destination port and thus may be incapable of storing data packets waiting to egress each destination port.

The communication link 204 provides a communication path by which the switch module and determination module may communicate. The communication link may be a communication link well known to those of skill in the art including a serial link, a bus, a parallel link, or the like.

The determination module 206, in one embodiment, limits the amount of data forwarded by one switch port during a condition application period according to a user-specified condition. This is accomplished by periodically retrieving statistical data for the port from the switch module during the condition application period; determining, after each retrieval, whether a user-specified condition has been met; configuring the switch module to no longer forward data packets received at the port subsequent to determining that the user-specified condition has been met; and configuring the switch module to forward data packets received at the port after the condition application period has expired.

The determination module retrieves the statistical data for the port by requesting the statistical data from the switch module 202 via the communication link 204. In one embodiment, the determination module retrieves the statistical data by reading one or more switch module registers.

To determine whether the retrieved statistical data meets the user-specified condition, the determination module may need to determine a difference value for each parameter of the statistical data that is of interest. The difference value is the difference between the most recently retrieved parameter value and the parameter value retrieved at the beginning of the condition application period.

For example, if the statistical data of interest is a counter tracking the number of bytes received by a port, the determination module retrieves the current value of the counter from the switch module and then determines the difference between the current value of the counter and the value of the counter at the beginning of the condition application period, which was previously retrieved.

In determining the difference value, the determination module may need to account for a counter rollover if the current counter value is less than the counter value at the beginning of the condition application period. To account for a rollover, the determination module may need to know the maximum value of the counter.

Once the determination module has determined the difference value, the determination module determines whether the difference value meets the user-specified condition. The user-specified condition may be a threshold, a combination of a plurality of thresholds, a condition that the statistical data have a particular value, or other condition well known to those of skill in the art.

In one embodiment, the user-specified condition may require that the statistical data exceed a threshold. For example, the condition may be that the difference value for a particular port of the switch module is greater than or equal to a particular number of bytes. In another embodiment, the condition may require that the statistical data exceed at least one of two different thresholds.

For example, the condition may be that either a first difference value containing the number of bytes received by a particular port of the switch module be greater than or equal to a particular number of bytes or that a second difference value containing the number of data packets received by the particular port of the switch module be greater than or equal to a particular number of data packets.

If the user-specified condition is not satisfied, the determination module continues to periodically retrieve statistical data, calculate difference values, and compare the difference values to the user-specified condition. If the user-specified condition is satisfied, the determination module configures the switch module to no longer forward data packets subsequently received by the port.

This is done, in one embodiment, by configuring the port to be in blocking mode. While in blocking mode, the port continues to maintain a communication link with the device to which it is connected (e.g. data device or intermediate device) even though the port no longer forwards each data packet received from the device. Consequently, the fact that the port is blocked is transparent to the connected device. With the communication link maintained, the link appears to be operational to the connected device, and the connected device continues to send data packets to the port.

In one embodiment, the switch module counts the number of data packets dropped by the port while in blocking mode and makes this count available as statistical data. This count may be useful in allowing an operator to monitor the number of data packets dropped due to the user-specified condition and to adjust the user-specified condition, if necessary, to achieve a desired result. The switch module may also report the number of data packets dropped to a management system.

Configuring the port in blocking mode is advantageous because the device connected to the port does not know that the port is dropping the data packets it sends to the port. Consequently, the device continues operating normally by sending data packets to the port. The device does not notify a management system of the blocked port because the device does not know that the port is blocked. This lack of notification is desirable because once notice is sent to a management system, human intervention may be required to clear an alarm resulting from the notification.

Alternatively, the determination module may configure the switch module so that the port is non-operational. In this embodiment, the device connected to the port will sense that the port is non-operational and will not send additional data packets to the port. Once the device detects that the port is non-operational, the device may send notice of the non-operational port to a management system, likely resulting in an alarm.

In one embodiment, the determination module configures the switch module by sending a configuration command to the switch module 202 via the communication link 204. Alternatively, the determination module may write a particular value into a switch module register in order to configure the port. The determination module may also use other methods of configuring the switch module that are well known to those of skill in the art.

Once the condition application period has expired, the determination module configures the switch module to forward data packets received at the port subsequent to the configuration. For example, if the port was in blocking mode, the determination module configures the switch module so that the port is no longer in blocking mode. The configuration is accomplished by one of the methods described above such as writing a value to a register of the switch module.

Following the expiration of the condition application period, a new condition application period is commenced during which the determination module repeats the steps described above. Consequently, the determination module effectively creates a rate limit by allowing a port to forward data packets until a user-specified condition is met and then preventing the port from forwarding additional data packets until the end of the condition application period.

In one embodiment, the determination module comprises a general purpose computer processor on which instructions are executed to perform the functionality described above. These instructions may advantageously be upgraded without affecting the functionality of the switch module since they operate on a silicon device (the general purpose computer processor) that is distinct from the switch module.

In this embodiment, the general purpose computer processor is separate from and non-integral with the switch module. The general purpose processor may be capable of substantially simultaneously performing additional tasks unrelated to the functionality of the determination module, such as communicating with a management system.

The switch module and the determination module work together to effectively create a rate limit. In one embodiment, the switch module is a relatively inexpensive device incapable of autonomously determining whether statistical data meets a user-specified condition. The combination of this relatively inexpensive switch module with the determination module is advantageous since the combination effectively provides a rate limit without requiring a relatively expensive, sophisticated switch module that is traditionally required to implement a rate limit.

FIG. 3 is a chart 300 illustrating the operation of the determination module and switch module in regulating the amount of data forwarded by a port during a condition application period. The x axis of the chart represents a condition application period 302. The condition application period is divided into six sub-periods 304, 306, 308, 310, 312, and 314. The y axis of the chart represents the number of bytes of data forwarded by the port to one or more destination ports of the switch module.

At the beginning of the first sub-period 304 (which is also the beginning of the condition application period 302) the determination module retrieves a value of a byte counter associated with the port from the switch module. This value is referred to herein as the baseline value. The baseline value is the number of bytes of data forwarded by the port since the last counter rollover or the last counter reset.

The port is allowed to forward data packets for the duration of the first sub-period 304. At the end of the first sub-period, the determination module retrieves a current value of the byte counter from the switch module. The determination module then subtracts the baseline value from the current value (compensating for a counter rollover if necessary) to determine the total number of bytes forwarded by the port during the condition application period, referred to herein as the period total 316. For this first sub-period, the period total 316 is also the number of bytes forwarded by the port during the first sub-period 318.

The determination module compares the period total 316 to a user-specified threshold 320 and determines that the period total 316 is less than the threshold 320. Since the threshold has not been exceeded, the determination module does not alter the configuration of the switch module. Accordingly, the port is allowed to forward data packets for the duration of the second sub-period 306.

At the end of the second sub-period, the determination module retrieves a current value of the byte counter from the switch module. The determination module then subtracts the baseline value from the current value (compensating for a counter rollover if necessary) to determine a new period total 322. The chart also illustrates the number of bytes forwarded by the port during the second sub-period 324.

The determination module compares the period total 322 to the threshold 320 and determines that the period total 322 is less than the threshold 320. Since the threshold has not been exceeded, the determination module does not alter the configuration of the switch module. Accordingly, the port is allowed to forward data packets for the duration of the third sub-period 308.

At the end of the third sub-period, the determination module retrieves a current value of the byte counter from the switch module. The determination module then subtracts the baseline value from the current value (compensating for a counter rollover if necessary) to determine a new period total 326. The chart also illustrates the number of bytes forwarded by the port during the third sub-period 328.

The determination module compares the period total 326 to the threshold 320 and determines that the period total 326 is less than the threshold 320. Since the threshold has not been exceeded, the determination module does not alter the configuration of the switch module. Accordingly, the port is allowed to forward data packets for the duration of the fourth sub-period 310.

At the end of the fourth sub-period, the determination module retrieves a current value of the byte counter from the switch module. The determination module then subtracts the baseline value from the current value (compensating for a counter rollover if necessary) to determine a new period total 330. The chart also illustrates the number of bytes forwarded by the port during the third sub-period 332.

The determination module compares the period total 330 to the threshold 320 and determines that the period total 330 is greater than the threshold 320. Consequently, the determination module configures the switch module so that the port is blocked for the remainder of the condition application period 302. As a result, the port does not forward data packets that it receives during the fifth sub-period 312 or sixth sub-period 314.

Notice that the period total 330 is greater than the threshold 320 by an error amount 334. This is due to the fact that the port was allowed to forward data packets during the entire duration of the fourth sub-period 310. Since the determination module retrieves the counter value at the end of each sub-period rather than every time the port forwards a data packet, the determination module may not detect the precise point in time at which the threshold is exceeded. Thus, the period total may exceed the threshold.

In this embodiment, the size of the error amount 334 is bounded by the duration of the sub-period 310 and by the maximum rate at which the port may forward data packets. In the worst case, resulting in the largest error amount, the total number of bytes forwarded by the port during a portion of a condition application period is just barely below the threshold at the end of a sub-period so that the determination module does not block the port during the next sub-period, and the port forwards data packets at the maximum rate for the entire duration of the next sub-period.

Of course, the size of the error amount may be adjusted by changing the duration of the sub-period. A smaller sub-period results in a smaller error amount but requires that the determination module retrieve the current counter value from the switch module more often during the condition application period. Utilizing a larger sub-period results in a larger error amount and requires that the determination module retrieve the current counter value from the switch module less often during the condition application period.

An optimal sub-period duration may be chosen by considering factors such as a desired error amount, processing power of the determination module, processing power of the switch module, and other factors well known to those of skill in the art.

In one embodiment, the determination module may automatically adapt the user-specified threshold, the condition application period, or both to better accommodate a predictable stream of data packets received on a port. For example, historical usage data may indicate that a particular port regularly receives data packets in bursts such that each burst exceeds the user-specified threshold but the amount of time between bursts is longer than the condition application period. In this scenario, the average rate of the stream of data packets may be lower than an effective rate limit corresponding to the user-specified threshold, yet some of the data packets comprising the stream are dropped due to the bursty nature of the stream.

To better accommodate the stream of data packets, the determination module may lengthen the condition application period and correspondingly increase the threshold so that an entire burst is forwarded within a single condition application period without exceeding the user-specified threshold. Such an adjustment allows the stream to be forwarded without dropping any data packets and still remain, on average, below the effective rate limit associated with the original user-specified threshold.

FIG. 4 illustrates an exemplary method 400 of restricting the amount of data forwarded by a port based on a port data counter. In this exemplary method, the determination module starts a condition application period timer 402. The condition application period timer measures the duration of the condition application period discussed above in relation to FIG. 3. Next, the determination module resets a received data counter 404. The received data counter counts the total number of bytes received by the port during the condition application period.

The determination module then configures the port to forward data packets 406. In some embodiments, the determination module may first check to see if the port is already configured to forward data packets before configuring the port to forward data packets. The determination module then starts a sub-period timer 408. The sub-period timer measure the duration of a sub-period.

Next, the determination module determines whether the sub-period timer has expired 410. The expiration of the sub-period timer indicates the end of a sub-period. If the sub-period timer has not expired, the determination module loops back and again checks to see if the sub-period timer has expired. If the sub-period timer has expired, the determination module determines whether the condition application period timer has expired 412.

If the condition application period timer has expired, the end of the condition application period has been reached and the method starts over by initiating another condition application period 402. If the condition application period timer has not expired, the determination module determines whether the port is currently blocked 414. If the port is currently blocked, the method starts a new sub-period by starting the sub-period timer 408.

If the port is not currently blocked, the determination module retrieves statistical data for the port from the switch module and adjusts the received data counter 416 so that it contains a count of the total amount of data received by the port since the condition application period timer was started.

The determination module then compares the received data counter to a user-specified threshold to determine if the threshold has been exceeded 418. If the received data counter exceeds the threshold, the method starts a new sub-period by starting the sub-period timer 408. If the received data counter does not exceed the threshold, the determination module configures the port to be in blocked mode 420 and starts a new sub-period by starting the sub-period timer 408.

Other Embodiments of the Tools

The section above describes exemplary ways in which the tools temporarily alter the forwarding behavior of a switch when statistical data characterizing the switch satisfies a user-specified condition. The section below describes additional embodiments of the tools, including a process 500 shown in FIG. 5, which is illustrated as a series of blocks representing individual operations or acts preformed by the tools. Process 500 may be performed by a switch through computer-executable instructions on computer-readable media, hardware, a combination of both, or otherwise.

Figure 5:
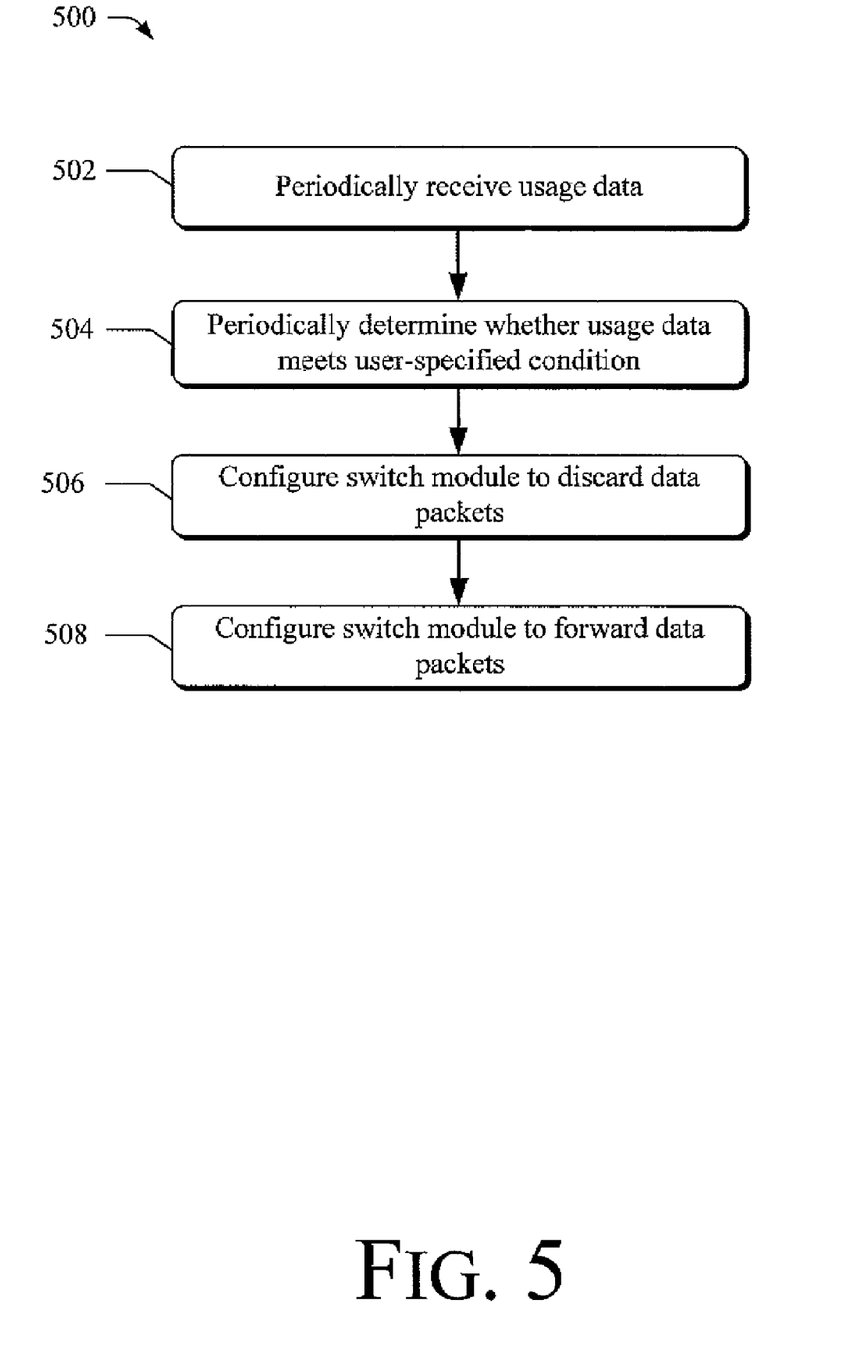
FIG. 5 is an exemplary process illustrating various embodiments and manners in which the tools configure a switch module to discontinue forwarding received data packets based on usage data.

At block 502 the tools periodically receive usage data for a port of a switch module from the switch module. As described above in relation to FIG. 2, the tools may retrieve the usage data from the switch module via the communication link 204 of FIG. 2. The usage data may comprise a byte counter, data-packet counter, or other usage data. The tools may receive the usage data once during each of a set of sub-periods making up a condition application period as described above in relation to FIG. 3.

At block 504 the tools determine whether the usage data meets a user-specified condition. The user-specified condition may comprise a single threshold, a plurality of thresholds, or other condition as described above in relation to FIG. 2. If the usage data does not meet the user-specified condition, the tools repeat block 502. If the usage data does meet the user-specified condition, the tools proceed to block 506.

At block 506, the tools configure the switch module to discontinue forwarding data packets received at the port for the balance of the condition application period. As described above in relation to FIG. 2, the tools may write a value into a register, send a request, or use another method of configuring the switch module. The tools may, as described above in relation to FIG. 2, configure the switch module so that the switch module maintains a communication link with a device connected to the port, thereby enabling the device to continue to send data packets to the port.

At block 508, the tools configure the switch module, after the expiration of the condition application period, to forward data packets subsequently received at the port. As described above in relation to FIG. 3, the tools may then begin a new condition application period.

Figure 6:
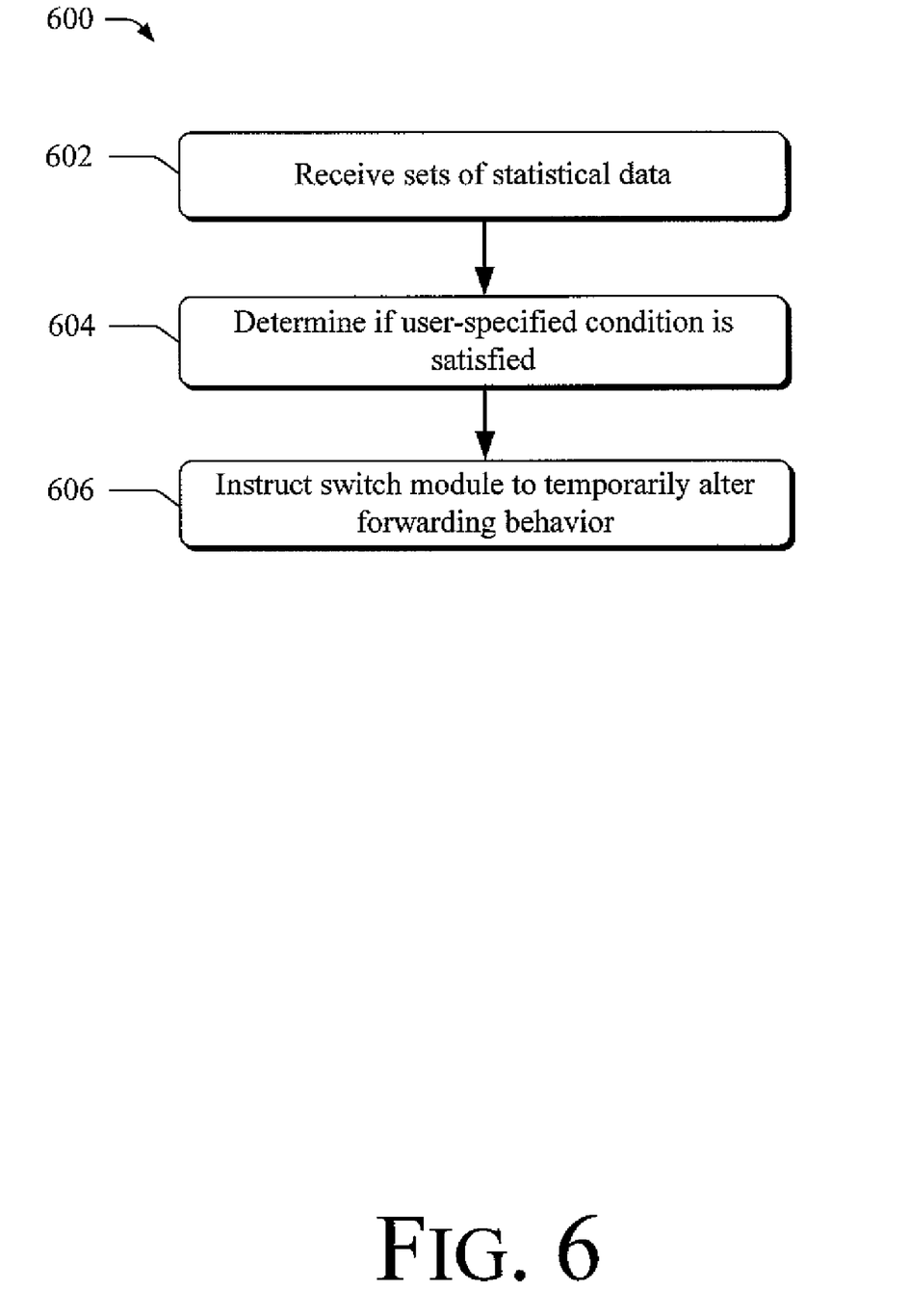
FIG. 6 is an exemplary process illustrating various embodiments and manners in which the tools instruct a switch module to temporarily alter its forwarding behavior based on statistical data.

FIG. 6 illustrates another embodiment of the tools as a set of computer executable instructions that, when executed, implement a method 600, which is illustrated as a series of blocks representing individual operations or acts performed by the tools. Process 600 may be performed by a switch through computer-executable instructions on computer-readable media, hardware, a combination of both, or otherwise.

At block 602, the tools sequentially receive a plurality of sets of statistical data during a predetermined time period from a switch module. The predetermined time period may be the condition application period described above in relation to FIG. 3. The statistical data may be a counter, as described above in relation to FIG. 3.

Alternatively, the statistical data may be a value, such as a temperature; a state, such as the state of a port (e.g. blocking, normal, down, etc.); or other parameter that characterizes the operation of the switch module. As described above in relation to FIG. 2, the tools may retrieve the usage data from the switch module via the communication link 204 of FIG. 2. The statistical data may comprise a single parameter, such as a counter, value, or state, or may comprise a plurality of parameters.

At block 604, the tools determine whether one of the sets of statistical data satisfies a user-specified condition. The user-specified condition may comprise a single threshold, a plurality of thresholds, or other condition as described above in relation to FIG. 2. If the statistical data does not meet the user-specified condition, the tools repeat block 602. If the usage data does meet the user-specified condition, the tools proceed to block 606.

At block 606, the tools instruct the switch module to temporarily alter a way in which the switch module forwards data packets until the end of the predetermined time period. The tools may, for example, instruct the switch module to disable a port or configure a port in blocking mode as described above in relation to FIG. 2.

The tools may also instruct the switch to alter its behavior in a more general way. For example, the tools may instruct the switch module to drop data packets received on all ports or transmit a Bridge Protocol Data Unit (BPDU) configured to change the topology of the network that the switch module is connected to so that the switch module no longer receives data packets on a particular port.

At the conclusion of the predetermined time period, the tools may instruct the switch module to discontinue the altered forwarding behavior and resume the forwarding behavior that was being practiced before the tools instructed the switch module to alter its forwarding behavior.

As described above in relation to FIG. 2, the switch module may be incapable of autonomously determining (without the aid of the tools) whether one of the sets of statistical data satisfies the user-specified condition.

Figure 7:
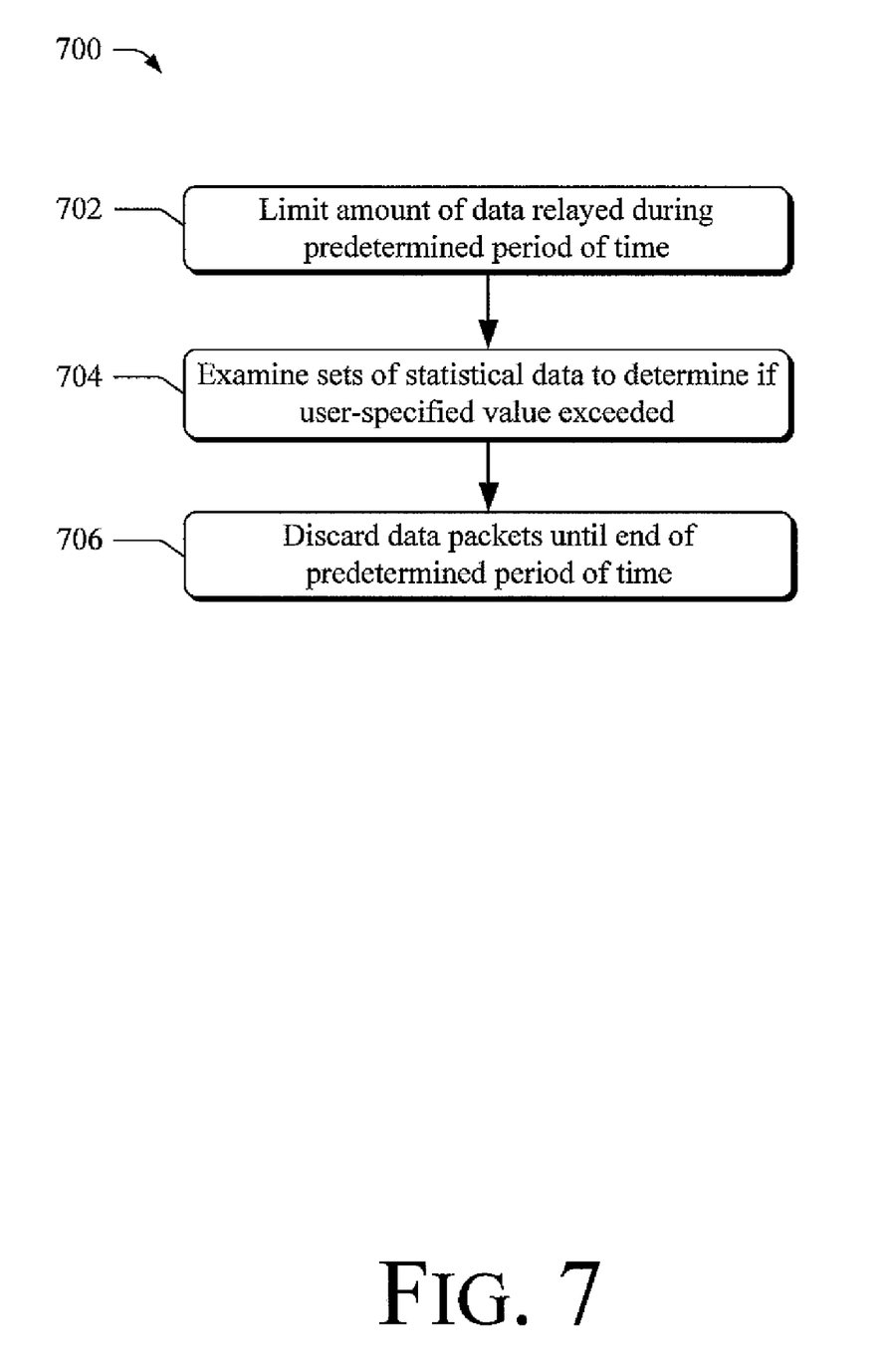
FIG. 7 is an exemplary process illustrating various embodiments and manners in which the tools discontinue forwarding data packets until the end of a predetermined time period based on statistical data.

FIG. 7 illustrates another embodiment of the tools as method 700, which is illustrated as a series of blocks representing individual operations or acts performed by the tools. Process 700 may be performed by a switch through computer-executable instructions on computer-readable media, hardware, a combination of both, or otherwise.

At block 702, the tools limit an amount of data relayed from an ingress switch port to one of a set of egress switch ports during a predetermined period of time to a user-specified value plus a finite excess value. As described above in relation to FIG. 3, the finite excess value may be determined, at least partially, by the length of a sub-period associated with the predetermined period of time.

At block 704, the tools examine a plurality of chronological sets of statistical data to determine if the user-specified value has been exceeded. The user-specified value may be the threshold described above in relation to FIG. 3. The chronological sets of statistical data may comprise a counter value, as described above in relation to FIG. 3, or may be a value, state or other statistical data characterizing the operation of the ingress switch port as described above in relation to FIG. 2.

At block 706, the tools discontinue forwarding data packets received by the ingress switch port from a time subsequent to determining that the user-specified value has been exceeded until the end of the predetermined period of time. As described above in relation to FIG. 2, a device sending the data packets to the ingress switch port may or may not be aware that the ingress switch port is no longer forwarding the data packets.

At the conclusion of the predetermined time period, the tools may resume forwarding data packets received at the ingress switch port.

CONCLUSION

The above-described tools enable data-network equipment to temporarily alter the forwarding behavior of a switch when statistical data characterizing the switch satisfies a user-specified condition. By so doing, the tools may effectively create a rate limit for a particular switch port. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A packet switch operating method comprising:
accessing statistical data, the statistical data characterizing operation of a switch module of a packet switch during each of a set of chronological equal-length time periods;
forwarding packets received by a port of the packet switch during at least a portion of each of the time periods of the set, the portions commencing at the beginnings of the time periods of the set;
based on the statistical data, the packet switch determining during each of the periods of the set whether a subset of the statistical data characterizing the operation of the switch module during a portion of the period satisfies a user-specified condition;
for periods of the set in which the user-specified condition is satisfied and in response to the determining, configuring the switch module to temporarily discard data packets received by the port from subsequent to the determining until the end of the period; and
after the conclusion of periods of the set during which the user-specified condition is satisfied, configuring the switch module to resume forwarding packets received on the port.

2. The method of claim 1, wherein the switch module is incapable of autonomously determining whether one of the subsets of the statistical data satisfies the user-specified condition.

3. The method of claim 1, wherein the switch module comprises an Ethernet switch chip incapable of storing data packets in a memory structure configured solely to queue data packets waiting to egress the Ethernet switch chip.

4. The method of claim 1, wherein the user-specified condition requires that one of the subsets of the statistical data exceed at least one of two statistical thresholds.

5. The method of claim 1, wherein the statistical data comprises a value of a byte counter configured to count a number of bytes received by the port.

6. The method of claim 1 further comprising the switch module counting a number of the data packets discarded by the switch module while the switch module is configured to temporarily discard the data packets received by the port.

7. The method of claim 1 wherein the packets received by the port are packets received from a network node connected to the port of the packet switch, the network node being physically distinct and remotely located from the packet switch.

8. The method of claim 7 wherein the statistical data comprises an amount of data received by the port from the network node.

9. The method of claim 1 wherein the configuring of the switch module to temporarily discard data packets comprises configuring the switch module to temporarily discard the data packets received by the port without first determining destination ports of the packet switch to which the discarded data packets should be forwarded.

10. A method implemented at least in part by a computing device comprising:
limiting an amount of data relayed from an ingress switch port to one or more of a set of egress switch ports during a predetermined period of time to a user-specified value plus a finite error value, the predetermined period of time comprising a plurality of sub-periods;
comparing an amount of data relayed from the ingress switch port to the one or more egress switch ports between the beginning of the predetermined period of time and the end of one of the sub-periods of the plurality with the user-specified value;
determining that during the one of the sub-periods of the plurality, the amount of data relayed from the ingress switch port to the one or more egress switch ports between the beginning of the predetermined period of time and the end of the one sub-period of the plurality exceeds the user-specified value;
discarding data packets received by the ingress switch port during sub-periods of the plurality occurring subsequent to the one sub-period of the plurality; and
wherein the amount of data relayed from the ingress switch port to the one or more egress switch ports between the beginning of the predetermined period of time and the end of the one sub-period of the plurality exceeds the user-specified value by the finite error value.

11. The method of claim 10, wherein the user-specified value is a first number of bytes and the finite error value is a second number of bytes.

12. The method of claim 10, further comprising automatically adapting, based on historical usage data, at least one of the predetermined period of time and the user-specified value to accommodate a repeated data-packet burst size.

13. The method of claim 10 wherein the finite error value is bounded by the duration of the one sub-period of the plurality.

14. The method of claim 10 further comprising prior to the comparing of the amount of data, determining the amount of data relayed from the ingress switch port to the one or more egress switch ports by accessing a value of a counter at the end of the one of the sub-periods of the plurality, determining that the counter rolled over during the one of the sub-periods of the plurality, and compensating for the counter rollover using a maximum value of the counter.

* * * * *